United States Patent [19]

Anderson et al.

[11] E Re. 30,195

[45] Reissued Jan. 15, 1980

[54] GUIDED BEAM FLAT DISPLAY DEVICE

[75] Inventors: Charles H. Anderson, Rocky Hill; Stanley Bloom, Bridgewater, both of N.J.

[73] Assignee: RCA Corporation, New York, N.Y.

[21] Appl. No.: 862,188

[22] Filed: Dec. 19, 1977

Related U.S. Patent Documents

Reissue of:

[64] Patent No.: 4,028,582
Issued: Jun. 7, 1977
Appl. No.: 615,353
Filed: Sep. 22, 1975

[51] Int. Cl.[2] ..... H01J 29/08; H01J 29/72; H01J 31/00

[52] U.S. Cl. ..... 313/422; 313/432

[58] Field of Search ..... 313/422; 315/366

[56] References Cited

U.S. PATENT DOCUMENTS

| | | | |
|---|---|---|---|
| Re. 23,672 | 6/1953 | Okolicsanyi | 313/426 X |
| 2,850,670 | 9/1958 | Aiken | 313/422 |
| 2,858,464 | 10/1958 | Roberts | 313/422 |
| 3,531,681 | 9/1970 | Harden | 315/13 |
| 3,683,224 | 8/1972 | Lea | 313/422 |
| 3,935,500 | 1/1976 | Oess et al. | 313/422 X |
| 4,031,427 | 6/1977 | Stanley | 313/422 |

*Primary Examiner*—Robert Segal
*Attorney, Agent, or Firm*—Glenn H. Bruestle; Donald S. Cohen; Vincent J. Coughlin, Jr.

[57] ABSTRACT

An evacuated envelope has a rectangular display section and a gun section at one edge of the display section. The display section includes front and back walls which are generally rectangular, in closely spaced, parallel relation, and a plurality of spaced, parallel support walls between the front and back walls forming a plurality of parallel channels. The gun section extends across one end of the channels and includes therein gun structure which will direct electrons into the channels. In each of the channels is a beam guide which confines the electrons in a beam and guides the beam along the length of the channel. The beam guide also includes means for selectively deflecting the electron beam out of the guide at selective points along the guide so that beam will impinge upon a phosphor screen along the inner surface of the front wall. In each of the channels is a scanning deflector which deflects the path of the beam as it passes from the guide to the phosphor screen so that each of the beams will scan a portion of the phosphor screen.

17 Claims, 3 Drawing Figures

GUIDED BEAM FLAT DISPLAY DEVICE

Matter enclosed in heavy brackets [ ] appears in the original patent but forms no part of this reissue specification; matter printed in italics indicates the additions made by reissue.

BACKGROUND OF THE INVENTION

The present invention relates to a guided beam type of flat display device wherein at least one and preferably each of a plurality of electron beams are scanned over a different area portion of an image screen. The invention relates particularly to a scan deflection structure for scanning each of the beams in one of its two orthogonal scan directions within its area portion of the screen.

One structure which has been proposed for a large area screen flat display device comprises a thin box-like envelope with one of the large sides thereof constituting a faceplate on which a phosphor screen is disposed. Within the envelope are a plurality of spaced, parallel support (against external atmospheric pressure) walls perpendicularly disposed to and between the large sides of the envelope forming a plurality of parallel channels. Across one end of the channels is a gun structure which directs at least one electron beam along each of the channels. In each of the channels is a beam guide which confines the electron beam in the channel and guides the beam along the length of the channel. The beam guide also includes means for deflecting the electron beam out of the beam guide at selected points along the beam guide. The beams in all of the channels are simultaneously deflected out of the beam guides toward the phosphor screen at each of the selected points to achieve a line-by-line scanning of the phosphor screen. This type of display as disclosed by the prior art required as many beams as picture elements desired for horizontal resolution in black and white operation and two or three times as many for color operation.

SUMMARY OF THE INVENTION

An electron display tube includes an evacuated envelope having a substantially rectangular front wall and a phosphor screen along the inner surface of the front wall. In the envelope is means for generating a beam of electrons and directing the beam in a first path generally parallel to and across the phosphor screen. Along the first beam path is means for selectively deflecting the beam out of the first path at selected points along the first path into a second path extending toward the phosphor screen so that the beam will impinge on the phosphor screen. Along the second path of the beam is means for deflecting the beam in a plane which is transverse to the first path of the beam and thereby causes the beam to scan at least a portion of the screen.

DETAILED DESCRIPTION

Figure 1:
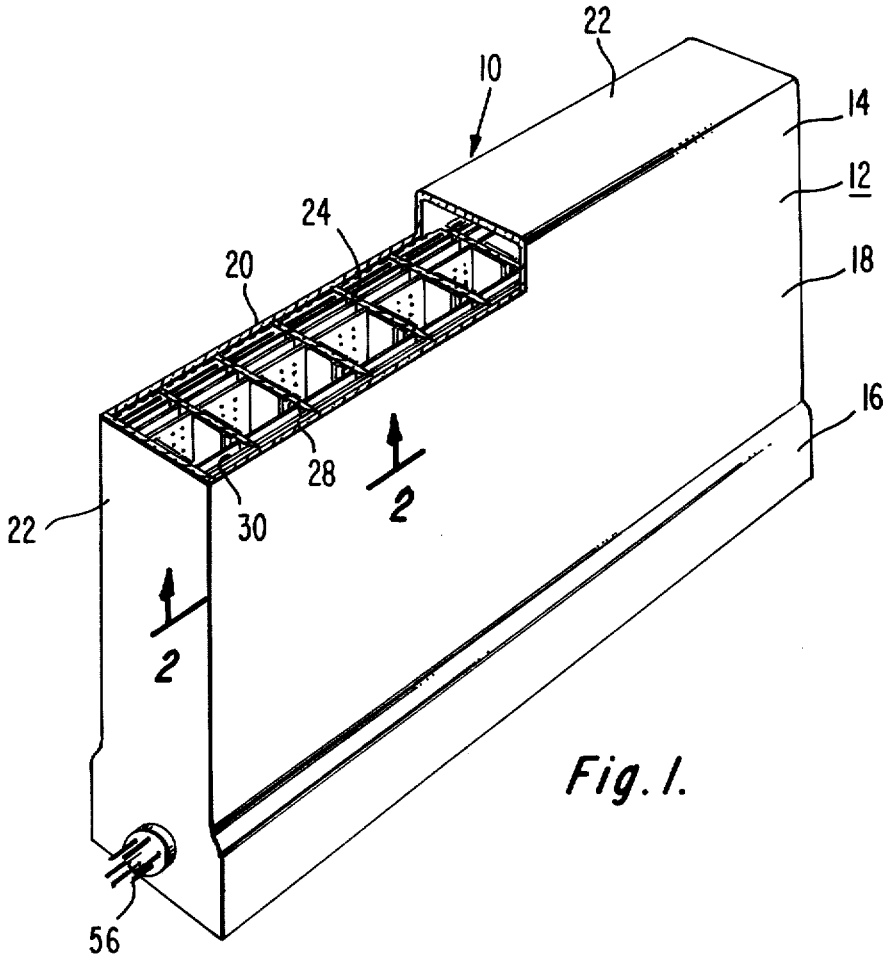
FIG. 1 is a perspective view of a guided beam flat display device of the present invention.

Referring to FIG. 1, a flat display device including the scan deflection structure of the present invention is generally designated as 10. The display device 10 comprises an evacuated envelope 12, typically of glass, having a display section 14 and an electronic gun section 16. The display section 14 includes a rectangular front wall 18 which is the viewing screen, and a rectangular back wall 20 in spaced parallel relation to the front wall 18. The front wall 18 and back wall 20 are connected by side walls 22. The front wall 18 and back wall 20 are dimensioned to correspond with the size of the viewing screen desired, e.g., about 30 by 40 inches (75 by 100 cm) and are spaced apart typically about 1-3 inches (2.5 to 7.5 cm).

Figure 2:
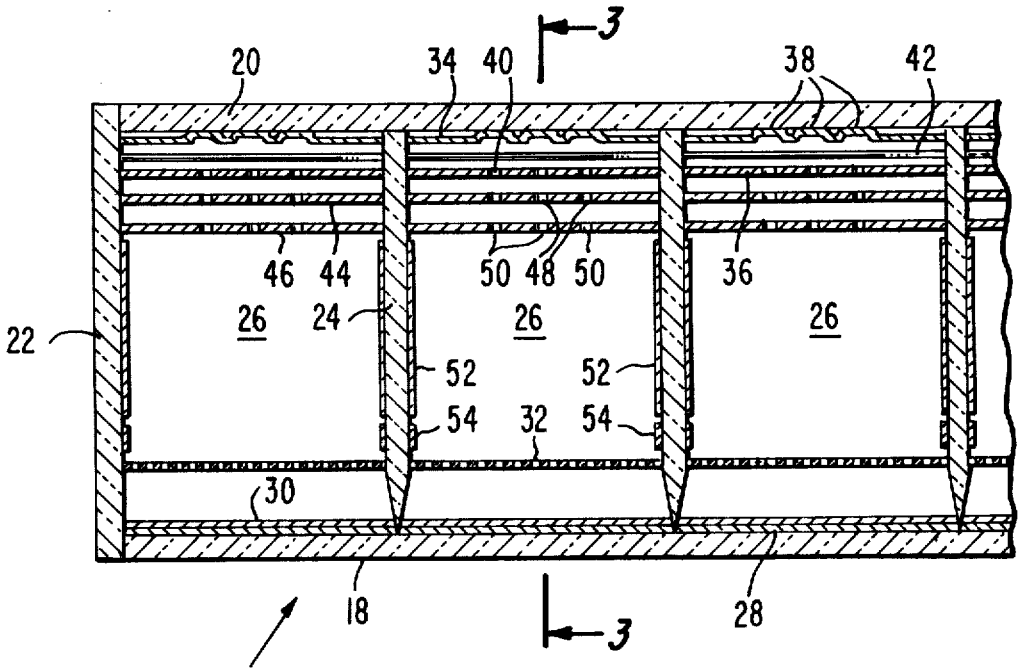
FIG. 2 is a sectional view of a portion of the display device taken along line 2—2 of FIG. 1.

As shown in FIG. 2, a plurality of spaced, substantially parallel, supporting walls 24, made of an electrically insulating material, such as glass, are secured between the front wall 18 and the back wall 20 and extend from the gun section 16 to the opposite side wall of the envelope 12. The supporting walls 24 provide the internal support for the evacuated envelope 12 against external atmospheric pressure, and divide the display section 14 into a plurality of channels 26. The edge of each of the supporting walls 24 which extends along the front wall 18 are tapered so as to provide a minimum area contact between the supporting walls 24 and the front wall 18.

On the inner surface of the front wall 18 is a phosphor screen 28. For a black and white display the phosphor screen 28 is of any well known composition used in black and white display devices. For a color display, the phosphor screen 28 is preferably made up of alternating strips of conventional phosphor compositions which emit red, green and blue when excited by electrons. On the phosphor screen 28 is a film 30 of an electrically conductive metal which is transparent to electrons, such as aluminum. For a color display, a shadow mask 32 extends across each of the channels 26 adjacent to but spaced from the phosphor screen 28. The shadow mask 32 is mounted on the supporting walls 24 and extends the full length of the channel 26. For a phosphor screen 28 made up of alternating strips, the shadow mask 32 includes rows of elongated slits such as described in U.S. Pat. No. 3,766,419 to R. L. Barbin, issued Oct. 16, 1973, entitled "Cathode-Ray Tube With Shadow Mask Having Random Web Distribution".

In each of the channels 26 adjacent the back wall 20 is an electron beam guide. The electron beam guide may be of any construction which will guide one or more electron beams along a first path extending along the length of the channel and will allow deflection of the beam at spaced points along the channel into a second path extending towards the phosphor screen 28. As shown, the electron beam guides are of the type disclosed in the copending application of T. Credelle, Ser. No. 607,490, filed Aug. 25, 1975, entitled "Flat Display Tube With Beam Guide".

The electron beam guide includes a first metal ground plane 34 extending along the inner surface of the back wall 20, and a second metal ground plane 36 spaced from and substantially parallel to the first ground plane 34. The first metal ground plane 34 has three U-shaped troughs 38 which face the second ground plane 36 and which extend in parallel relation along the entire length of the channel 26. The first ground plane 34 may be made of a single sheet of a conductive metal or may be a plurality of metal strips extending in parallel relation across the channel 26 and spaced longitudinally along the channel.

The second ground plane 36 is of a sheet of an electrically conductive metal and has three rows of spaced holes 40 therethrough with each row of the holes being over a separate one of the troughs 38 in the first ground plane 34.

A plurality of wires 42 extend traversely across the channel 26 between the first and second ground planes 34 and 36. The wires 42 are transverse the longitudinal dimension of the channel and are in spaced parallel relation along the entire length of the channel 26. The wires are positioned between the holes 40 in the second ground plane 36.

A focus plate 44 extends across each of the channels 26 adjacent to but spaced from the second ground plane 36, and an acceleration plate 46 extends across each of the channels 26 adjacent to but spaced from the focus plate 44. The focus plate 44 and the acceleration plate 46 are of an electrically conductive metal and extend the full length of the channel 26. The focus plate 44 and the acceleration plate 46 each has three rows of holes 48 and 50 respectively therethrough with the holes 48 and 50 being in alignment with the holes 40 in the second ground plate 46.

In each of the channels 26 are a pair of spaced, substantially parallel deflection electrodes 52. The deflection electrodes 52 extend between the acceleration plate 46 and the shadow mask 32 along the entire length of the channel 26. Preferably, the deflection electrodes 52 are on the surfaces of the supporting walls 24 or side wall 22 which forms the sides of the particular channel 26. On the surface of each of the supporting walls 24 or side wall 22 between the deflection electrode 52 and the shadow mask 32 is a line sampling electrode 54.

Figure 3:
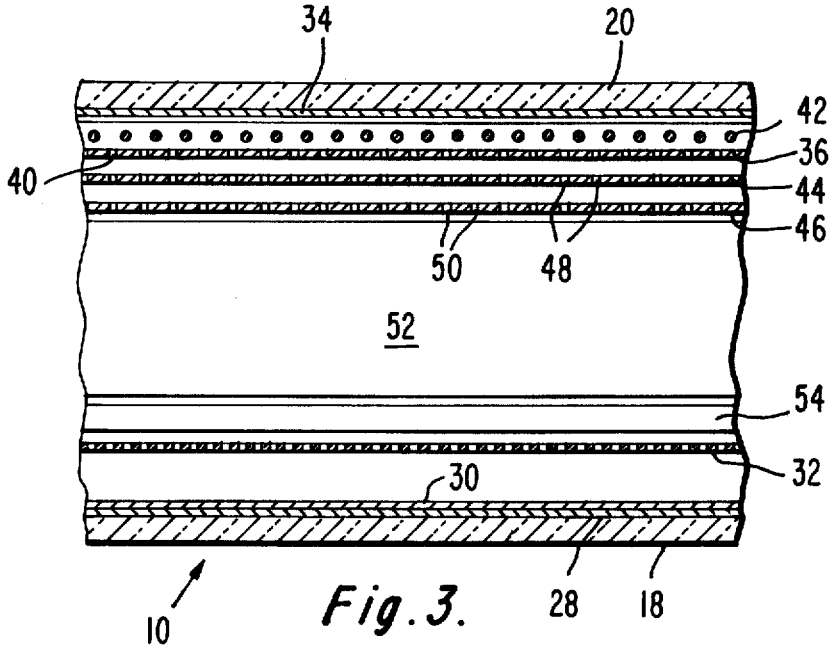
FIG. 3 is a sectional view of a portion of the display device taken along line 3—3 of FIG. 2.

The gun section 16 of the envelope 12 is an extension of the display section 14 and extends along one set of adjacent ends of the channels 26. The gun section 16 may be of any shape suitable to enclose the particular gun structure contained therein. The electron gun structure contained in the gun section 16 may be of any well known construction suitable for selectively directing at least one beam of electrons along each of the channels 26. For example, the gun structure may comprise a plurality of individual guns, one being mounted at one end of each of the channels 26 for directing separate beams of electrons along each of the channels. For a color display device of the type shown in FIGS. 2 and 3, three electron beams are required along each of the channels 26 with each beam being directed along a separate one of the troughs 38 in the first ground plane 34 of the beam guide. However, for a black and white display device only a single beam is required for each channel.

Another type of gun structure which can be used includes a line cathode extending along the gun section 16 across the ends of the channels 26 and adapted to selectively direct individual beams of electrons along the channels. A gun structure of this type is described in U.S. Pat. No. 2,858,464 to W. L. Roberts, issued Oct. 28, 1958, entitled "Cathode Ray Tube".

No matter what type of gun structure is used in the gun section 16, the gun structure should also include means for modulating the electron beams according to a video input signal. As shown in FIG. 1, a terminal 56 extends through a side wall 22 of the envelope 12. The terminal 54 includes a plurality of terminal wires by which the gun structure and other parts of the display within the envelope 12 can be electrically connected to suitable operating circuitry and power source outside of the envelope 12.

In the operation of the display device 10, the gun structure in the gun section 16 generates and directs at least one beam of electrons into each of the channels 26. For a color display device preferably three beams of electrons are directed into each of the channels 26. The electron beams are directed between the ground planes 34 and 36 of the beam guide with each beam being directed along a separate one of the troughs 38 in the first ground plane 34. In the beam guides, the ground plates 34 and 36 are at ground potential and the wires 42 are at a positive potential. As described in the previously referred to pending application of T. Credelle, this causes each of the electron beams to travel in an undulating path through the wires 42 and between the ground planes 34 and 36 along the entire length of the channel 26. The U-shape of the troughs 38 causes electrostatic forces to be applied to each of the electron beams as the beam passes between the wires 42 and the first ground plane 34 to confine the electrons of each beam between the sides of the troughs so that each beam will flow along a separate one of the troughs. Thus, each of the electron beams flows along a first path along its respective channel 26 from the gun section 16 to the side wall 22 of the envelope 12 opposite the gun section.

When the electron beams reach a selected point along the guide, the electron beams are deflected out of the first path into a second path extending toward the front wall of the envelope 12. This can be achieved by switching the potential applied to the wire 42 adjacent the side wall 22 to a negative potential, or, if the first ground plane 34 is in the form of a plurality of parallel strips, by switching the potential applied to the strip adjacent the side wall 22 to a negative potential. The selected point of deflection out of the guide is progressively moved along the guide toward the electron gun end thereof to effect vertical scanning.

The deflected electron beams pass out of the beam guide through adjacent holes 40 in the second ground plane 36. The electron beams will then pass through the holes 48 in the focus plate 44 and the holes 50 in the acceleration plate 46. A potential positive with respect to the second ground plane 36 is applied to the focus plate 44 so as to focus the beams as they pass through the holes 48, and a potential also positive with respect to the second ground 36 and preferably the same potential as that on the metal film 30, is applied to the acceleration plate 46 so as to accelerate the flow of the beams as they pass through the holes 50. The electron beams will flow toward the phosphor screen 28 by a positive potential applied to the metal film 30 on the phosphor screen 28.

As the electron beams flow along their second paths from the acceleration plate 46 to the phosphor screen 28, the electron beams pass between the deflection electrodes 52. Initially, one of the deflection electrodes 52 in each of the channels 26 is at a potential positive with respect to the potential applied to the metal film 30 on the phosphor screen 28 and the other of the deflection electrodes is at a potential negative with respect to the potential applied to the metal film 30. This causes the second paths of the electron beams to be deflected toward the deflection electrode which is at the positive potential. The potentials applied to the deflection electrodes 52 are such that the second paths of the electron beams are deflected sufficiently to cause the beams to initially impinge on the phosphor screen 28 juxtaposed the supporting wall 24 on which is the positively charged deflection electrode 52. The potentials applied to the deflection electrodes 52 are varied in conventional manner by application of appropriate deflection signals thereto to effect a horizontal scanning of the beam across a portion of the screen equal to the width of a channel. By similarly deflecting the beams in each of the channels across its respective channel, a visual line will be created across the full width of the phosphor screen 28 to achieve a complete horizontal line scan of the phosphor screen. The horizontal scanning of the phosphor screen 28 is combined with the vertical scanning to light up the entire screen. By modulating the beams at the gun structure, a display can be achieved on the phosphor screen 28 which can be viewed through the front wall 18 of the display device.

Each time the second paths of the beams are deflected transversely across the channels by the deflection electrodes 52, at least one beam in each channel will impinge on at least one if not both of the line sampling electrodes 54. When a beam impinges on a line sampling electrode 54 an electrical signal is generated in the electrode which can be detected. This signal can be used to determine the position of the beams so as to achieve proper alignment of the corresponding beams in each of the channels. This signal can also be used to determine the beam current to insure uniform brightness of the display across the screen. Thus, the line sampling electrodes 54 can be used to detect the position and/or the intensity of the current of the beams. This information can be used to control the signals to the deflection electrodes 52 to properly align all of the beams and/or control the signal to the gun structure to achieve proper current levels and landing position at the screen.

Although the display device 10 has been described as having three beams directed along each of the channels 26 to achieve a color display, for a black and white display only one beam of electrons need be directed into the beam guide in each of the channels 26, and the shadow mask 32 would not be required. However, the display device would operate in the same manner as previously described with the single beam in each of the channels 26 being deflected out of its first path along the beam guide at a plurality of points along the channel into second paths toward the phosphor screen 28. As the beam passes between the deflection electrodes 52 the beam would be deflected transversely across the channel 26 to achieve line scans of the phosphor screen 28.

Thus, there is provided a flat display device in which a plurality of electron beams are directed through channels along first paths substantially parallel to the phosphor screen on the front wall of the device. The beams are deflected out of the first paths into second paths extending toward the phosphor screen at a plurality of spaced points along the first paths. As the beams pass along each of the second paths each of the beams is deflected across a plane which traverses and is substantially perpendicular to the first path of the beam so that the beam sweeps the portion of the phosphor screen which extends transversely across the channel to provide a line scan of the phosphor screen.

By having each beam scan transversely across the portion of the phosphor screen in each channel, which channel is substantially wider than the diameter of the beam, the number of beams necessary to achieve a scanning of the entire width of the display device is reduced. For example, for a display device 40 inches (100 cm) in width having channels which are 1 inch (2.5 cm) in width only 40 beams for black and white and 40 sets of three beams for color are necessary. This simplifies the gun structure necessary for the display device. This also simplifies the internal structure of the display device by reducing the number of supporting walls and beam guides required. Also, since the channels are much wider than the diameter of the electron beams, the dimensional tolerances of the widths of the beam guides are not as critical.

We claim:

1. An electron display device comprising an evacuated envelope having a substantially flat front wall, a phosphor screen along the inner surface of said front wall, *said screen comprising a plurality of picture elements,* means in said device for generating a beam of electrons and directing said beam in a first path generally parallel to and across said phosphor screen, means along said first beam path for selectively deflecting said beam out of said first path at selected points along said first path into a second path extending toward said phosphor screen so that the beam will impinge on said phosphor screen, and means along said second path for deflecting said beam in a plane transverse to said first path of the beam so that the beam will scan at least a portion of the phosphor screen *comprising more than one of said picture elements.*

2. An electron display device [in accordance with claim 1 in which the means for deflecting said beam as it moves along the second path comprises] *comprising an evacuated envelope having a substantially flat front wall,*

*a phosphor screen along the inner surface of said front wall, said screen comprising a plurality of picture elements,*

*means in said device for generating a beam of electrons and directing said beam in a first path generally parallel to and across said phosphor screen,*

*means along said first beam path for selectively deflecting said beam out of said first path at selected points along said first path into a second path extending toward said phosphor screen so that the beam will impinge on said phosphor screen, and*

*means along said second path for deflecting said beam in a plane transverse to said first path of the beam so that the beam will scan at least a portion of the phosphor screen comprising more than one of said picture elements, said means along said second path comprising,* a pair of spaced, substantially parallel deflection electrodes between the first path of the electron beam and the phosphor screen and positioned so that the second paths of the electron beam passes between the deflection electrodes.

3. An electron display device in accordance with claim 2 including a beam guide for guiding said beam along said first path and which includes means for deflecting said beam into said second paths at spaced points along the beam guide.

4. An electron display device [in accordance with claim 1 including] *comprising*

*an evacuated envelope having a substantially flat front wall,*

*a phosphor screen along the inner surface of said front wall, said screen comprising a plurality of picture*

*elements,* means *in said device* for generating a plurality of electron beams and directing said beams along separate first paths substantially parallel to and across said [front wall] *phosphor screen,* means along each of said first paths for *selectively* deflecting each of said beams out of its respective first path [of] *at* selected points along the first path into second paths extending toward said phosphor screen, *so that the beam will impinge on said phosphor screen,* and means along the second paths of each of said beams for deflecting the beams as they move along their second paths [through] *in* a plane transverse to the first paths of the beams so that each of the beams scans *at least* a portion of the phosphor screen *comprising more than one of said picture elements.*

5. An electron display device in accordance with claim 4 in which the means for deflecting each of the electron beams as it moves along its second path comprises a pair of spaced, substantially parallel deflection electrodes between the first path of the electron beam and the phosphor screen and positioned so that the second path of the beam extends between the deflection electrodes.

6. An electron display device in accordance with claim 5 including a plurality of pairs of spaced, substantially parallel deflection electrodes with each pair of deflection electrodes being positioned so that the second paths of at least one electron beam passes between the deflection electrodes of each pair.

7. An electron display device in accordance with claim 6 in which the first paths of the electron beams are spaced apart such that different electron beams scan different portions of the phosphor screen.

8. An electron display device comprising:

an evacuated envelope having closely spaced, substantially parallel, front and back walls, and a plurality of spaced, substantially parallel support walls extending substantially perpendicularly between said front and back walls and forming a plurality of channels extending across said front and back walls, a phosphor screen along the inner surface of said front wall in each of said channels, *said screen comprising a plurality of defined picture elements,* means at one end of said channel for generating and directing at least one beam of electrons along each of said channels along a first path generally parallel to and along said front wall, means in each of said channels for selectively deflecting the beam in the channel out of its first path at selected points along the channel into second paths extending toward said phosphor screen so that the beam will impinge on the phosphor screen, and means in each of said channels for deflecting the beam in the channel as it moves along its second paths in a plane which [tranverses] *transverses* the first path of the beam so that the beam will scan the portion of the phosphor screen in the channel [traversely] *transversely* across the channel, *said portion comprising more than one picture element.*

9. An electron display device [in accordance with claim 8 in which the] *comprising:*

*an evacuated envelope having closely spaced, substantially parallel, front and back walls, and a plurality of spaced, substantially parallel support walls extending substantially perpendicularly between said front and back walls and forming a plurality of channels extending across said front and back walls,*

*a phosphor screen along the inner surface of said front wall in each of said channels, said screen comprising a plurality of defined picture elements,*

*means at one end of said channel for generating and directing at least one beam of electrons along each of said channels along a first path generally parallel to and along said front wall,*

*means in each of said channels for selectively deflecting the beam in the channel out of its first path at selected points along the channel into second paths extending toward said phosphor screen so that the beam will impinge on the phosphor screen, and*

*means in each of said channels for deflecting the beam in the channel as it moves along its second paths in a plane which transverses the first path of the beam so that the beam will scan the portion of the phosphor screen in the channel transversely across the channel, said portion comprising more than one picture element, said* means in each channel for deflecting the beam as it moves along its second paths [comprises *comprising* a pair of deflection electrodes extending in spaced parallel relation between the first path of the beam and the phosphor screen and positioned so that the second paths of the beam extend between said deflection electrodes.

10. An electron display device in accordance with claim 9 in which each deflection electrode extends along a separate one of the support walls forming the sides of the respective channel.

11. An electron display device in accordance with claim 10 in which each of the deflection electrodes is a metal film on the support wall along which it extends.

12. An electron display device in accordance with claim 10 including a beam guide extending along the back wall in each of the channels, said beam guide being adapted to guide the electron beam along its first path but permitting the deflection of the beam into its second paths at spaced points along the beam guide.

13. An electron display device [in accordance with claim 12 including] *comprising:*

*an evacuated envelope having closely spaced, substantially parallel, front and back walls, and a plurality of spaced, substantially parallel support walls extending substantially perpendicularly between said front and back walls and forming a plurality of channels extending across said front and back walls,*

*a phosphor screen along the inner surface of said front wall in each of said channels, said screen comprising a plurality of defined picture elements,* means *at one end of said channel,* for generating and directing a plurality of beams of electrons [into] *along* each of the channels, [and] *along a first path generally parallel to and along said front wall,* a separate beam guide extending along each channel for each of the beams, *means in each of said channels for selectively deflecting the beams in the channel out of said first path at selected points along the channel into second paths extending toward said phosphor screen so that the beams will impinge on the phopshor screen, and*

*means in each of said channels for deflecting the beams in the channel as said beams move along said second paths in a plane which transverses said first path of said beams so that the beams will scan the portion of the phosphor screen in the channel transversely across the channel, said portion comprising more than one picture element.*

14. An electron display device in accordance with claim 10 including line sampling electrodes extending along at least one of the support walls in each of the channels between the deflection electrode and the phosphor screen, said line sampling electrode being engageable by an electron beam in said channel as the beam moves along its second path.

15. An electron display device in accordance with claim 13 including a shadow mask extending across each channel [between the deflection electrodes and] *adjacent to the* phosphor screen, said shadow mask having a plurality of openings therethrough which the beam pass.

16. An electron display device in accordance with claim 15 in which there are three beam guides in each channel and the means for generating and directing beams into each channel can direct a separate beam into each beam guide.

17. An electron display device in accordance with claim 16 including a focus plate extending across each channel between the beam guides and the deflection electrodes and an acceleration plate extends across each channel between the focus plate and the deflection electrodes, each of said focus plates and acceleration plates having three rows of holes therethrough with each row extending longitudinally along a separate beam guide.

* * * * *

UNITED STATES PATENT AND TRADEMARK OFFICE
CERTIFICATE OF CORRECTION

PATENT NO. : Re. 30,195

DATED : January 15, 1980

INVENTOR(S) : Charles H. Anderson et al

It is certified that error appears in the above-identified patent and that said Letters Patent is hereby corrected as shown below:

| | |
|---|---|
| Column 4, line 30, | After "wall" insert --18--. |
| Column 8, line 23 (Claim 9) | "[comprises" should be --[comprises]--. |

Signed and Sealed this

Fourth Day of November 1980

[SEAL]

*Attest:*

SIDNEY A. DIAMOND

*Attesting Officer*

*Commissioner of Patents and Trademarks*